Jan. 21, 1958     E. C. YOKEL     2,820,653
OIL COOLED SEAL

Filed March 9, 1955     2 Sheets-Sheet 1

Inventor:
Edward C. Yokel

Jan. 21, 1958  E. C. YOKEL  2,820,653
OIL COOLED SEAL
Filed March 9, 1955  2 Sheets-Sheet 2
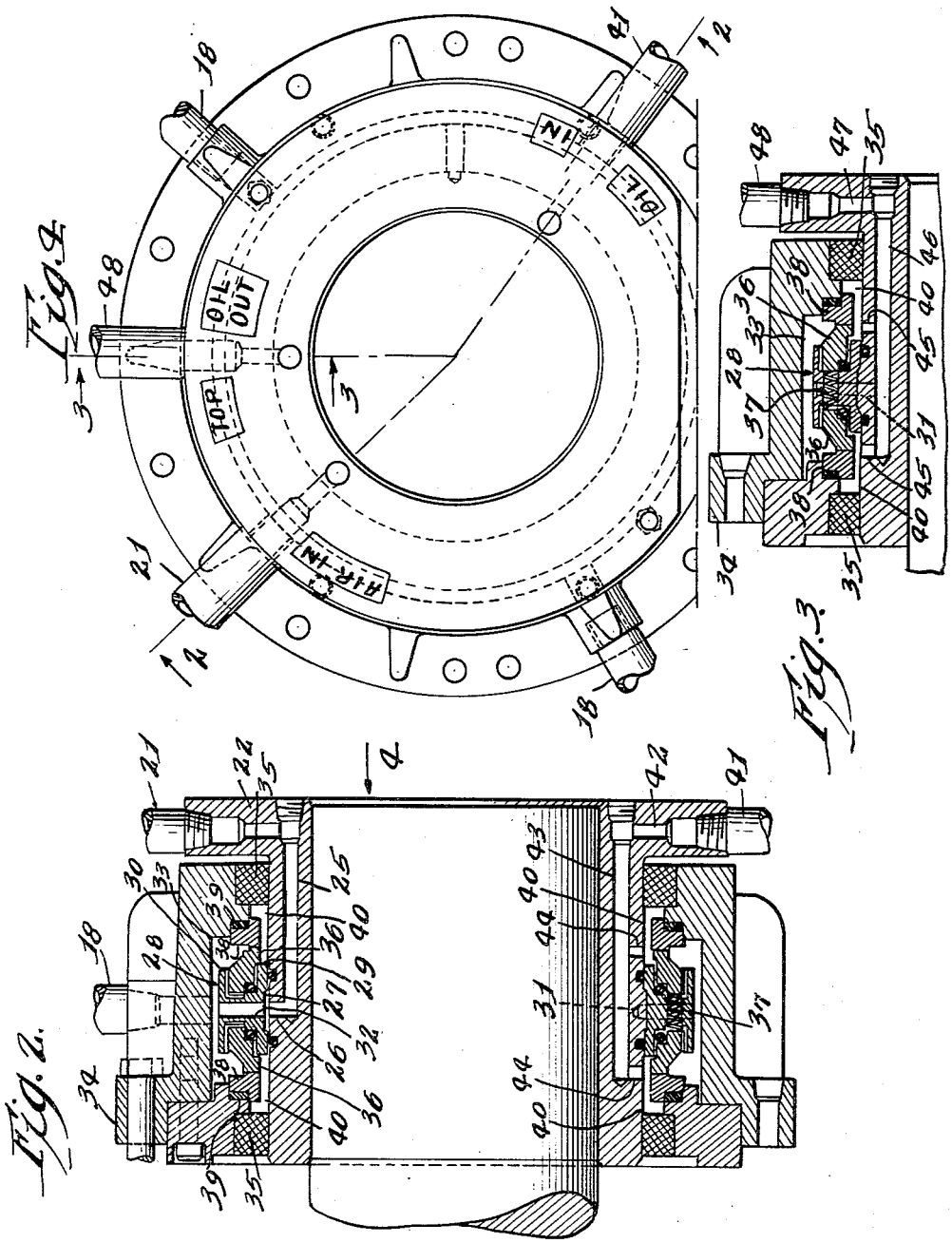
Inventor.
Edward C. Yokel.
By
Attorney.

United States Patent Office 2,820,653
Patented Jan. 21, 1958

2,820,653

OIL COOLED SEAL

Edward C. Yokel, Racine, Wis., assignor to Twin Disc Clutch Company, Racine, Wis., a corporation of Wisconsin Application March 9, 1955, Serial No. 493,125

6 Claims. (Cl. 286—19)

My invention relates to oil cooled air seals and more particularly to one of the lapped face type in which one of the sealing elements rotates.

Seals of this character are normally used to retain liquids so that cooling does not present a serious problem, but where it is desired to seal air, such as where supplied under pressure to an air actuated clutch, the matter of cooling the seal to insure a reasonable life for the sealing elements becomes important.

It is therefore one object of my invention to provide a fluid sealing structure having coacting annular, seal faces in which provision is made for transferring the heat therefrom to a fluid medium other than the fluid being sealed.

A further object is to provide a sealing structure of the character indicated in which heat transfer is accelerated by setting up a whirling or turbulent action in the cooling medium.

These and further objects of the invention will be set forth in the following specification, reference being had to the accompanying drawings, and the novel means by which the objects are effectuated will be definitely pointed out in the claims.

In the drawings:

Fig. 2 is a sectional elevation of the seal as viewed in Fig. 1, but additionally showing the inlet passages for the cooling oil, the section being taken along the line 2—2 in Fig. 4.

Fig. 3 is a fragmentary, sectional elevation of that part of the seal which includes the outlet passages for the cooling oil, the section being taken along the line 3—3 in Fig. 4.

Fig. 4 is an end view of the seal looking in the direction of the arrow 4 in Fig. 2.

Figure 1:
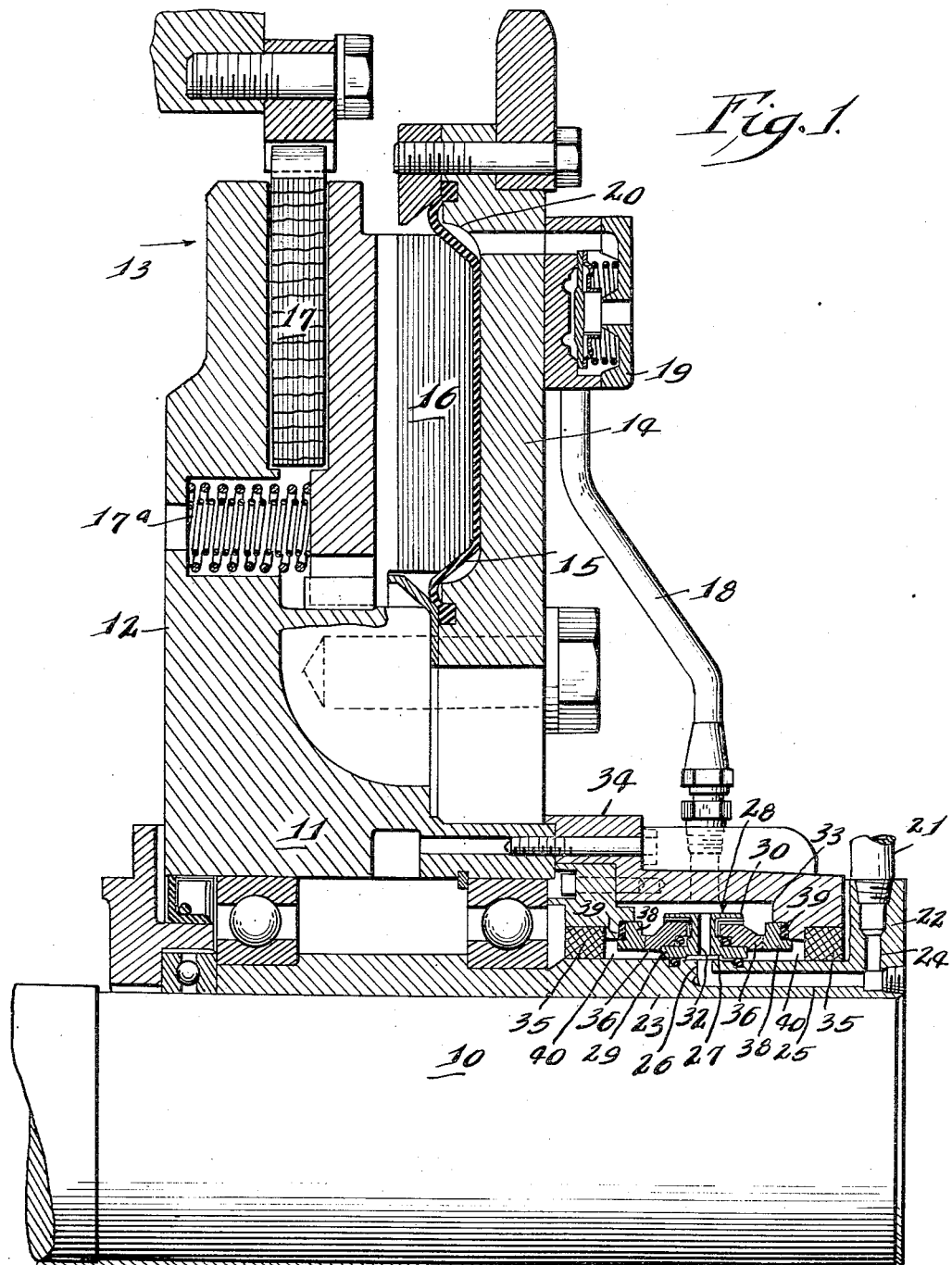
Fig. 1 is a fragmentary, sectional elevation of an air operated clutch as a typical operating environment and showing the relation of the part of the improved seal through which air pressure is supplied to the clutch.

Referring to Fig. 1, the numeral 10 designates a fixed cylindrical beam on which is suitably journaled a hub 11 carrying an abutment plate 12 forming part of an air operated clutch indicated generally by the numeral 13. Carried by and rotatable with the abutment plate 12 is an annular plate 14 whose periphery is fashioned for driven connection with a power source (not shown). The outer and inner, peripheral edges of an annular, rubber diaphragm 15 are clamped to the annular plate 14 in engaging relation to an annular, pressure plate 16 whose inner, peripheral portion has toothed, sliding contact with the hub 11. When the diaphragm 15 is flexed by air pressure in an engaging direction, the pressure plate 16 grips a driven plate 17 against the abutment plate 12 in the usual manner. Springs 17ª effect release of the pressure plate 17 when the air pressure is cut off.

Engaging flexure of the diaphragm 15 is achieved by supplying pressure air through a pipe 18 and quick release valve 19 to an annular cylinder 20 included between the annular plate 14 and diaphragm. The valve 19 is of conventional type and any number may be used.

So far as described, the clutch 13 is intended to exemplify a typical operating situation for the improved seal and the clutch per se forms no part of the invention.

Referring to Figs. 1, 2 and 4, air under pressure and selective control is supplied through a pipe 21 whose delivery end is mounted in a flange 22 carried by one end of a sleeve 23 which encircles and is fast on the beam 10. Included in the flange 22 is a radial passage 24 whose outer portion connects with the pipe 21 while its inner part communicates with one end of a longitudinal passage 25 in the sleeve 23 and whose opposite end connects with a radial passage 26. The outer end of the passage 26 constantly communicates with an annular chamber 27 included between the sleeve 23 and the inner portion of an annular holder 28. Specifically, this holder is shaped transversely as an I-section including inner and outer, annular wings 29 and 30 which are spaced radially from each other for a purpose presently explained, the wings 29 sealably encircling the beam 10 and the holder 28 being held against movement relative to the sleeve 23 by a pin 31 (see Fig. 2).

A radial passage 32 extends through the holder 28 with its opposite ends constantly connecting, respectively, with the annular chamber 27 and an annular chamber 33 partly included between the holder 28, an annular shell 34 and other parts presently identified. The shell 34 is attached to and rotates with the clutch hub 11 and its ends have sealing contact with the sleeve 23 through conventional seal rings 35—35. The inlet end of the air pipe 18 communicates with the annular chamber 33 and normally there would be a second pipe 18 (see Fig. 4) generally oppositely disposed to the pipe 18 shown in Fig. 1 to balance pressure application to the clutch cylinder.

Carried by the holder 28 and on opposite sides thereof between the wings 29 and 30 are carbon seal rings 36—36 which are sealably related to the inner wings 29 and are constantly urged in directions away from each other by a plurality of springs 37 equispaced around the holder, only one spring being shown (see Fig. 2). The action of the springs 37 presses the carbon rings 36 into sealing contact with metallic rings 38—38, preferably composed of cast iron which are elastically backed by rubber rings 39—39 substantially enclosed by complementary shapings of the adjacent portions of the shell 34 and metallic rings 38. The rings 38 and 39 rotate with the shell 34 and the former have a running seal with the stationary carbon rings 36. Further, the rings 36 and 38 partly define the annular chamber 33 and serve to retain air therein and also, in conjunction with the sleeve 23, seals 35—35 and wings 29—29, define annular chambers 40—40 spaced longitudinally along the sleeve 23 for the reception of cooling oil as presently described.

Referring to Figs. 2 and 4, this oil proceeds from a suitable source that may include a cooler (not shown) and flows through a pipe 41 into a radial passage 42 in the sleeve flange 22 and thence through a longitudinal passage 43 in the sleeve 23 into spaced radial passages 44—44 which connect with the annular chambers 40—40, respectively. The outlet for the cooling oil is illustrated in Figs. 3 and 4 wherein the chambers 40—40 are tapped at a convenient circumferential spacing from the radial passages 44—44 by similar passages 45—45 which connect through a longitudinal passage 46 and radial passage 47 with an outlet pipe 48 that returns the oil to the source thereof, the passages 45 and 46 being located in the sleeve 23 and the passage 47 in the sleeve flange 22.

When the clutch is engaged by air pressure as above described, the shell 34 rotates with the clutch hub 11 as do the metallic sealing rings 38—38, while the coacting sealing rings 36—36 remain stationary and a continuous flow of cooling oil is maintained through the annular chambers 40—40. Heat generated at the working faces of the rings 36 and 38 is conducted through the latter rings, as facilitated by their metallic nature, preferably cast iron, to the surfaces thereof which are exposed to the cooling oil in the chambers 40—40. Heat transfer to the oil is accelerated by reason of the turbulence produced in the oil by the rotary movement of the metallic rings 38—38. This arrangement enables cooling to be achieved on surfaces other than the sealing surfaces and the disposition of the cast iron rings 38—38 provides for maximum heat transfer to the oil.

I claim:

1. An annular seal in a main passage for supplying a gas to a rotating member comprising rotating and stationary components, the rotating component carrying a heat conducting ring having an annular sealing face and the stationary component including a generally transverse portion of the main passage connectible with the member for supplying the gas thereto and having a sealing ring whose end face coacts within the sealing face of the heat conducting ring to seal the gas flow, an annular chamber defined and separated from said portion of the passage for gas by parts of the stationary component, the sealing ring and the heat conducting ring, and means for flowing a cooling medium through the chamber and over the surface of the heat conducting ring exposed therein for heat transfer.

2. An annular seal in a main passage for supplying a gas to a rotating member comprising rotating and stationary components, the rotating component carrying a heat conducting ring having an annular sealing face and having an elastic backing interposed between the rotating component and the heat conducting ring and the stationary component including a generally transverse portion of the main passage connectible with the member for supplying the gas thereto and having a spring actuated, sealing ring whose end face coacts with the sealing face of the heat conducting ring to seal the gas flow, an annular chamber defined and separated from said portion of the passage for gas by parts of the stationary component, the sealing ring and the heat conducting ring, and means for flowing a cooling medium through the chamber and over the surface of the heat conducting ring exposed therein for heat transfer.

3. An annular seal in a main passage for supplying a gas to a rotating member comprising rotating and stationary components, the rotating component carrying a cast iron ring having an annular sealing face and the stationary component including a generally transverse portion of the main passage connectible with the member for suppling the gas thereto and having a carbon ring whose end face coacts with the sealing face of the cast iron ring to seal the gas flow, an annular chamber defined and separated from said portion of the passage for gas by parts of the stationary component, the carbon ring and the cast iron ring, and means for flowing a cooling medium through the chamber and over the surface of the cast iron ring exposed therein for heat transfer.

4. An annular seal in a main passage for supplying a gas to a rotating member, comprising rotating and stationary components, the rotating component carrying a heat conducting ring having an annular sealing face and the stationary component including a generally transverse portion of the main passage connectible with the member for supplying the gas thereto and having a sealing ring whose end face coacts with the sealing face of the heat conducting ring to seal the gas flow, an annular chamber defined and separated from said portion of the passage for gas by parts of the stationary component including the sealing ring carried thereby and the heat conducting ring, and means for flowing a cooling medium through the chamber and over the surface of the heat conducting ring exposed therein for heat transfer.

5. An annular seal in a main passage for supplying a gas to a rotating member surrounding a stationary member, an annular holder surrounding the stationary member and sealably related thereto, the stationary member and holder including connecting gas passages forming parts of said main passage, rings extending from opposite sides of the holder and having annular seal faces, an annular shell carried by the rotating member whose ends have sealing contact with the stationary member and whose intermediate portion is spaced from the holder to define an annular gas receiving chamber connecting with the holder gas passages and forming part of said main passage, a pair of heat conducting rings carried by the shell having annular sealing faces coacting with the holder mounted ring sealing faces, respectively, a pair of spaced, annular chambers defined and separated from the gas receiving chamber by the stationary member, shell, holder and the heat conducting and holder mounted rings, and means for flowing a cooling medium through the last named chambers and over the surfaces of the heat conducting rings exposed therein for heat transfer.

6. An annular seal in a main passage for supplying a gas to a rotating member surrounding a stationary member, an annular holder surrounding the stationary member and sealably related thereto, the stationary member and holder including connecting gas passages forming parts of said main passage, carbon rings extending from opposite sides of the holder and having annular seal faces, an annular shell carried by the rotating member whose ends having sealing contact with the stationary member and whose intermediate portion is spaced from the holder to define an annular gas receiving chamber connectible with the holder gas passages and forming part of said main passage, a pair of cast iron rings carried by the shell having annular sealing faces coacting with the carbon ring sealing faces, respectively, a pair of spaced, annular chambers defined and separated from the gas receiving chamber by the stationary member, shell, holder and the cast iron and carbon rings, and means for flowing a cooling medium through the last named chambers and over the surfaces of the cast iron rings exposed therein for heat tranfser.

References Cited in the file of this patent

UNITED STATES PATENTS

| | | |
|---|---|---|
| 2,131,544 | Weiland | Sept. 27, 1938 |
| 2,270,927 | Browne | Jan. 27, 1942 |
| 2,653,837 | Voytech | Sept. 29, 1953 |